(12) United States Patent
Stafford et al.

(10) Patent No.: US 11,376,511 B2
(45) Date of Patent: Jul. 5, 2022

(54) INTERACTIVE GAMING VIA MOBILE PLAYMAKER

(71) Applicant: NTN Buzztime, Inc., Carlsbad, CA (US)

(72) Inventors: Chad M. Stafford, San Marcos, CA (US); Justin Cooper, Poway, CA (US); Nicholas Glassman, Venice, CA (US); Steve Mayer, Leucadia, CA (US)

(73) Assignee: EGAMES.COM HOLDINGS LLC, Carlsbad, CA (US)

( * ) Notice: Subject to any disclaimer, the term of this patent is extended or adjusted under 35 U.S.C. 154(b) by 0 days.

(21) Appl. No.: 17/087,737

(22) Filed: Nov. 3, 2020

(65) Prior Publication Data

US 2021/0046389 A1 Feb. 18, 2021

Related U.S. Application Data

(62) Division of application No. 15/173,648, filed on Jun. 4, 2016, now Pat. No. 10,821,367, which is a division
(Continued)

(51) Int. Cl.
*A63F 13/352* (2014.01)
*A63F 13/87* (2014.01)
(Continued)

(52) U.S. Cl.
CPC ............ *A63F 13/87* (2014.09); *A63F 13/332* (2014.09); *A63F 13/352* (2014.09); *A63F 13/537* (2014.09); *A63F 13/61* (2014.09); *A63F 13/71* (2014.09); *H04L 67/38* (2013.01); *H04W 4/023* (2013.01); *A63F 2300/204* (2013.01);
(Continued)

(58) Field of Classification Search
CPC ...... A63F 13/87; A63F 13/332; A63F 13/352; A63F 13/537; A63F 13/61; A63F 13/71; H04L 67/38; H04W 4/023; H04W 4/08
See application file for complete search history.

(56) References Cited

U.S. PATENT DOCUMENTS

| 7,510,474 B2 * | 3/2009 | Carter, Sr. ............... G07F 17/32 463/16 |
| 2003/0003997 A1 * | 1/2003 | Vuong ................ G07F 17/3239 463/42 |

(Continued)

*Primary Examiner* — Thomas J Hong
*Assistant Examiner* — Carl V Larsen
(74) *Attorney, Agent, or Firm* — Thibault Patent Group

(57) ABSTRACT

A gaming system, comprising a site server configured to provide game instances to local gaming devices in communication with the site server, a monitor for displaying video information related to the game instances, a central server configured to provide information about the availability of a game to players using local gaming devices in proximity of the site server, provide information about the availability of the game to one of the mobile telephones over the wide-area wireless network, receive, from the one or more mobile telephones, an indication of a selected game offered by the central server, and relay game instances between the site server and the one or more mobile telephones as the selected game is being played by players using the local gaming devices and players using the one or more mobile telephones via the wide-area wireless network.

16 Claims, 6 Drawing Sheets

Related U.S. Application Data of application No. 14/054,947, filed on Oct. 16, 2013, now Pat. No. 9,358,463, which is a division of application No. 13/153,247, filed on Jun. 3, 2011, now Pat. No. 8,562,442.

(60) Provisional application No. 61/351,243, filed on Jun. 3, 2010.

(51) Int. Cl.
*A63F 13/332* (2014.01)
*A63F 13/61* (2014.01)
*A63F 13/71* (2014.01)
*H04W 4/02* (2018.01)
*H04L 67/131* (2022.01)
*A63F 13/537* (2014.01)
*H04W 4/08* (2009.01)

(52) U.S. Cl.
CPC .............. *A63F 2300/406* (2013.01); *A63F 2300/513* (2013.01); *A63F 2300/538* (2013.01); *A63F 2300/5506* (2013.01); *A63F 2300/5566* (2013.01); *A63F 2300/5573* (2013.01); *A63F 2300/5593* (2013.01); *H04W 4/08* (2013.01)

(56) References Cited

U.S. PATENT DOCUMENTS

| | | | |
|---|---|---|---|
| 2003/0043762 A1* | 3/2003 | Pang | H04L 63/08 370/328 |
| 2009/0186700 A1* | 7/2009 | Konkle | A63F 13/332 463/42 |
| 2010/0105464 A1* | 4/2010 | Storm | A63F 13/00 463/20 |

* cited by examiner

INTERACTIVE GAMING VIA MOBILE PLAYMAKER

PRIORITY CLAIM

This application is a divisional of U.S. patent application Ser. No. 15/173,648 filed on Jun. 4, 2016, now U.S. Pat. No. 10,821,367, which is a divisional of U.S. patent application Ser. No. 14/054,947, filed on Oct. 16, 2013, which is a divisional of U.S. patent application Ser. No. 13/153,247, filed on Jun. 3, 2011, which claims the benefit of U.S. provisional application Ser. No. 61/351,243, filed on Jun. 3, 2010.

BACKGROUND

This patent document relates to interactive gaming environments. Interactive gaming environments can include multiple users interacting with a main controller. The multiple users can be dispersed across multiple locations. Examples of interactive games include games that interact with video feeds from a football, question-and-answer games, or trivia. The response time of a user's input into the interactive gaming environment can be compared to the other users' response times.

Interactive gaming environments can be provided over various communication pathways such as computer networks, e.g., Internet, wireless networks, or television signal distribution architectures. Television signal distribution architectures have been developed to provide alternatives to traditional over-the-air broadcasting. For example, since the late 1940's, cable television systems have been used to deliver television signals to subscribers. Cable television systems distribute signals over optical fibers and/or electrical cables, such as coaxial cable. Further, wireless-cable systems have been developed using microwave signals as the distribution medium. Cable television systems permit the distribution of both typical over-the-air content, such as broadcast networks, and specialized content, such as pay channels and video on demand.

In a cable television system, television programming representing a number of individual television channels is coordinated at a headend for distribution to subscribers, such as endpoints within a particular geographic region. All of the endpoints serviced by a headend receive a common signal. Television programming representing a plurality of separate frequency bands is multiplexed onto a single cable. The television signal can be encoded as an analog signal or a digital signal. A set-top box (or "cable television tuner") at the receiving location, such as a subscriber's home or business, provides access to a single channel of the multiplexed signal. Thus, a single channel included in the cable television signal can be tuned and presented on a corresponding device, such as a television or computer monitor.

Direct broadcast satellite television systems also have been developed as an alternative to over-the-air broadcasting. As with cable television, direct broadcast satellite television provides a single, multiplexed signal that is decoded using a set-top box (or "satellite receiver"). The distribution medium between the satellite broadcaster and the set-top box, however, is a radio frequency signal, such as a Ku-band transmission.

Until recently, both cable and satellite television distribution systems were limited to receive-only. Because coaxial cables are capable of bi-directional transmission, however, additional services have been merged with cable television systems. For example, voice and data services have been offered over cable television distribution systems. Similarly, the cable television transmission path can serve as a back-channel for information sent from the set-top box to the cable television provider. Typically the bandwidth upstream from a set-top box to a headend is lower than the downstream bandwidth from the headend to the set-top box. Further, satellite television providers also have implemented bi-directional communication capabilities and are offering additional services, such as internet connectivity, in conjunction with the television signal distribution architecture.

SUMMARY

This document describes, among other things, technologies that allow game players to use their mobile devices as mobile playmakers in interactive gaming environments.

A system for interactive gaming can include one or more site servers providing game instances to one or more devices in communication with the site server via a wired network, a wireless network, or both. The system includes a server system in communication with the one or more site servers; and one or more wireless mobile devices in communication with the server system. The server system can be configured to provide information about one or more of the gaming instances at one or more sites to the one or more mobile devices; receive, from the one or more mobile devices, an indication of a selected gaming instance of the gaming instances; relay gaming information between the one or more site servers and the one or more mobile devices; and provide gaming content and one or more gaming functions to the site servers.

The system, among other systems, can include one or more of the following features. The server system can include a server that is configured to provide a video feed to the one or more mobile devices. The one or more mobile devices can be configured to display the video feed on a mobile device display. The server system can include a scoring server that maintains player score data for one or more of the game instances. The server system can include a gaming server system that is configured to contain, receive, integrate and execute video data, game data and game application. The one or more wireless mobile devices can be configured to run a game control application which encodes and sends a mobile device's physical location information to the gaming server system. The gaming server system can be configured to match a mobile device's physical location to at least one of the one or more site servers. The gaming server system can be configured to run one or more game applications that build and run game contests among players connected via respective mobile devices in a given physical location and players connected via a site server at the same physical location.

In another aspect, a system for interacting gaming can include site servers configured to provide gaming instances at respective gaming locations, a first server system, and a second server system. The first server system can be configured to (i) receive location information associated with a mobile device, (ii) provide, based on the location information, information about one or more of the gaming instances to the mobile device, and (iii) receive, from the mobile device, an indication of a selected gaming instance of the gaming instances. The second server system can interact with the gaming instances and route gaming messages to and from the site servers. The second server system can be configured to (i) receive, from the mobile device, a gaming message associated with the selected gaming instance, (ii) identify a site server of the site servers that provides the selected gaming instance, and (iii) send the gaming message to the identified site server. The first server system can direct the mobile device to communicate with the second server system based on the received indication.

The system, among other systems, can include one or more of the following features. The first server system can be configured to (i) identify a gaming location of the gaming locations based on the location information and (ii) provide information to the mobile device to prompt a user of the mobile device to join a gaming instance associated with the identified gaming location. The system can include a server system that is configured to provide information to synchronize the selected gaming instance with a display of a video feed at the corresponding gaming location. The system can include a server system that is configured to provide the video feed to the mobile device, where the mobile device is configured to display the video feed on a display of the mobile device. The system can include a server system that is configured to provide the video feed to the mobile device and to cause the mobile device to display a video advertisement on a display of the mobile device based on a synchronization with the display of the video feed at the corresponding gaming location, where the mobile device is configured to display the video feed on the display of the mobile device. In some implementations, the first server system includes the second server system.

A technique for interactive gaming can include communicating with two or more site servers that provide a gaming experience in two or more gaming locations, respectively; receiving, from a mobile device, a request to join a game, the request indicative of a geographical location of the mobile device; selecting one or more of the site servers based on the geographical location of the mobile device; and sending contact information of the selected one or more site servers to the mobile device. Other implementations of this aspect include corresponding systems, apparatus, and programs encoded on computer storage devices.

These, and other implementations, can include one or more of the following features. Selecting one or more of the site servers based on the geographical location of the mobile device can include selecting a site server based on a proximity between the geographical location of the mobile device and a gaming location associated with a site server. Implementations can include causing the mobile device to display a video advertisement based on a synchronization with the display of the video feed. Implementations can include operating a scoring server that maintains player score data for game instances that are provided by the site servers.

Sending contact information can include sending an address of a multiplayer server. The multiplayer server can be configured to route messages between the mobile device and the selected one or more site servers. Implementations can include sending information about one or more selected site servers to the mobile device, the information identifying one or more gaming instances that are provided by the one or more selected site servers; and receiving, from the mobile device, an indication of a selected gaming instance of the one or more gaming instances. Sending contact information can include sending information that directs the mobile device to communicate with a server system associated with the selected gaming instance. Implementations can include receiving, from the mobile device, a gaming message associated with the selected gaming instance; identifying a site server of the site servers that provides the selected gaming instance; and sending the gaming message to the identified site server.

Implementations can include operating a server system that is configured to provide information to synchronize a game play with a display of a video feed. The video feed can be displayed at two or more gaming locations. Implementations can include causing the mobile device to display the video feed. Implementations can include causing the mobile device to display a video advertisement based on a synchronization with the display of the video feed.

The details of one or more implementations are set forth in the accompanying drawings and the description below. Other features, aspects, and advantages will become apparent from the description, the drawings, and the claims.

BRIEF DESCRIPTION OF THE DRAWINGS

Like reference symbols and designations in the various drawings indicate like elements.

DETAILED DESCRIPTION

Figure 1:
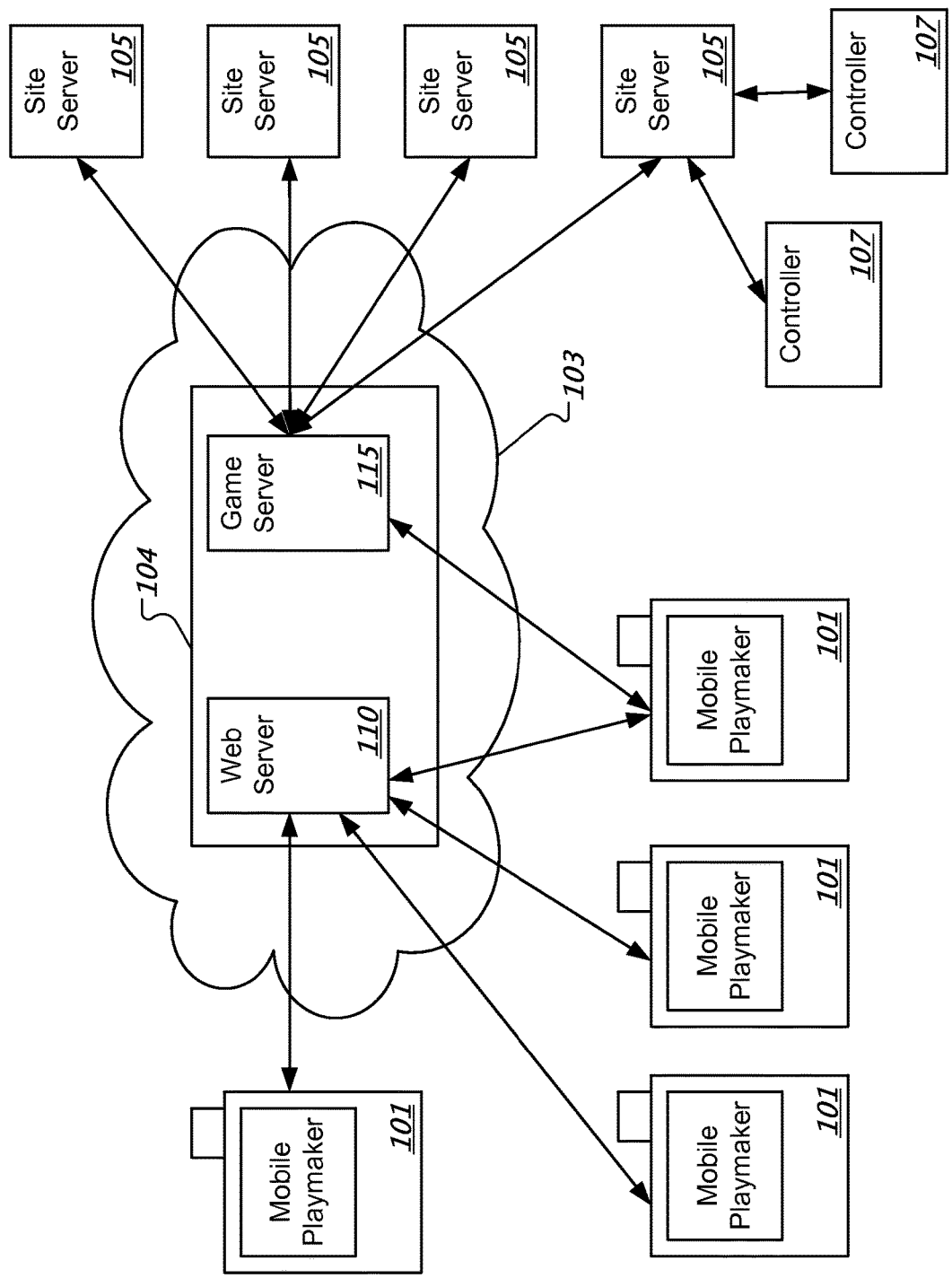
FIGS. 1, 2, 3, and 4 show different examples of interactive gaming environments.

This document describes, among other things, techniques and systems that allow game players to use their mobile devices, such as a mobile phone or a tablet computer, to participate in interactive gaming environments. A mobile device can run a mobile playmaker application that provides access to a gaming network. The gaming network provides connectivity to site servers running gaming instances at respective gaming locations. Further, the gaming network provides a communication pathway between mobile devices and site servers. In some cases, game play can be coordinated between multiple locations via the gaming network.

Game players, such as those without mobile phones that are capable of running the mobile playmaker application, can access the gaming network via controllers that reside at a gaming location. The controllers are connected with a site server associated with the gaming location. A game player, for example, can be matched up and play games against other players that are associated with the same gaming location regardless of how they are accessing the gaming network (e.g., accessing the gaming network by a mobile device or accessing the gaming network by a controller).

Participants of an interactive gaming environment can be located in multiple locations or in a single location. Gaming locations can include public locations such as bars, restaurants, and in general, gaming establishments. These gaming locations can be associated with separate gaming instances. For example, a trivia gaming instance at Joe's Bar is separate from a trivia gaming instance at Jim's Traven. In some cases, however, a gaming instance can be associated with more than one gaming location. For example, participants at Joe's Bar join with the participants at Jim's Traven to play a trivia game.

Interactive gaming environments can include displaying game information at one or more locations. Game information can be synchronized with live feed video.

For example, the QB1 game, available from NTN Buzztime of Carlsbad, Calif., can synchronize a gaming environment with a real-time video feed of a football game. Other games can include question-and-answer games such as trivia games. In each of these games, a user at some remote location plays in the game. The game can be played either by itself or can be scored against one or more other players who are playing the game at the same time.

Gaming establishments can provide playmakers so that users can play the game. However, such playmaker devices can be relatively expensive and can be a barrier to entry for many gaming establishments. Thus, it is advantageous for an interactive gaming environment to interface with a user's own mobile device. For example, multiple access points can be used to allow access to a game server to enable the use of a user's own mobile device. Multiple types of devices, including wireless and wired, can be used to interact with the game server. The devices can include mobile phones, personal data assistants, wireless playmaker devices, or wireless tablet computers.

Interactive gaming environments can be of a time sensitive nature. For example, game scoring can include determining when a user made a response, e.g., pushed the "send" button, to a game event and comparing that time with response times of other users. Time sensitive gaming environments can require game information to be displayed on a playmaker within specific time frames. A game event, for example, can include a question presented to players of the game, or sport players preparing to start a play. Timing can be an important element when scoring game responses.

Time sensitive gaming environments can require a user to make a response at a specified time or before a specified time. For example, a sports-based game can be played in sync with a real-life game such as football. In one such sports-based game, the users can attempt to guess the play that will be made by the team at the next play time. A game response can include a type of play. As the offense approaches the line of scrimmage, the players can guess the contents of the play. For example, a user can make a guess based on the way the offense approaches, body language, line up positions, etc. Game responses can be locked out before the play starts to avoid any game player receiving an unfair advantage. However, it can be advantageous to allow players to see the sport's players up to the last second, at the line of scrimmage, so that the game players can make the best guesses. The user with the most correct guesses wins the game. Therefore, such a sports based game can attempt to synchronize with the football "snap" to allow game responses up until the moment of the snap. In another example, in a question-and-answer game, a user can receive more points when answering the questions sooner, and/or can receive hints at different times. Therefore, compensating for latency can be important for such time sensitive games.

In an interactive gaming environment where game responses are received from multiple disparate physical networks, the different latencies between the disparate networks to the game server can become an issue. These disparate networks can include local area wireless networks, such as those based on IEEE 802.11 standards, wide area wireless networks, and cellular networks by multiple service providers. In addition, the mode of communication within these disparate sources can include IP-based packets and text messages using a protocol such as Short Message Service (SMS). Further, poor signal strength in a wireless network can increase the latency of an individual mobile device used in the network. Latency can vary greatly between these disparate networks. Such variations in latency can impact the scoring of a game if the timing of the receipt of the game response at the main controller is used to determine when a user made the game response.

Interactive gaming environments can include one or more server systems. A server system can include one or more servers such as a game server that coordinates game play. In some implementations, a game server can control a site server to coordinate game play at a gaming location. A server system can include one or more remote processing units (e.g. set-top box or other embedded systems, programmed general purpose computers) that act together with the game server or independently.

FIG. 1 shows an example of an interactive gaming environment. Mobile devices 101 can run a game control application, e.g., a mobile playmaker application. A gaming server system 104 can provide gaming information to the game control applications so that a user of a mobile device 101 can participate in a game. In some implementations, the gaming server system 104 can provide information to cause a game control application to connect to a site server 105 in a specific location (e.g., a gaming establishment, night club, bar, or lounge) that coordinates a local experience of a game. In some implementations, the gaming server system 104 can provide information to cause a game control application to use a server such as a proxy server to communicate with a site server 105.

A gaming server system 104 can contain, receive, integrate and execute video data, game data, and game applications. In some implementations, a gaming server system 104 includes a game server 115 that runs gaming related processes. In some implementations, a gaming server system 104 can include one or more servers such as headend servers or headend collocated servers. A web server 110, included in the gaming server system 104, can be configured to match a mobile device's 101 physical location to a gaming location associated with a site server 105. For example, the mobile device 101 can send the web server 110 a request for information about any gaming instances at a gaming location that is in proximity with a phone's physical location. The web server 110 can identify a gaming instance and can send information on how to communicate with the gaming instance to the mobile device 101.

A game control application, running on a mobile device 101, can encode and send a mobile device's physical location to a gaming server system 104 via one or more networks 103. In some implementations, a game control application causes a mobile device 101 to determine geographical coordinates of the mobile device 101 based on receiving signals from one or more satellites in a global positioning system (GPS). In some implementations, a mobile device 101 can send GPS signals to a server which determines the geographical coordinates and sends the geographical coordinates to the mobile device 101.

In some implementations, a game control application can retrieve, from a mobile device 101 communication process, one or more identifiers of base stations in a wireless communication system that is serving the mobile device 101. The game control application can send information such as one or more base station identifiers to the gaming server system 104. The gaming server system 104 can determine an approximate physical location of the mobile device 101 based on the base station identifiers. In some implementations, a gaming server system 104 can determine an approximate area of a mobile device 101 based on a network address, such as an IP address, associated with the mobile device 101.

A game server 115 of a gaming server system 104 can run one or more game applications that build and run game contests among players. The game server 115 can provide communication between different local game experiences that are created by site servers 105. A player can be connected via his mobile device 101 to a site server 105 to play a game. Alternatively, a player can be connected via a local controller 107 to play the game. A local controller 107 can be connected to a site server 105 via a local wireless connection or wired connection. In some implementations, a mobile playmaker application, running on a mobile device 101, can request a list of game sites that are associated with a mobile device's physical location. A gaming server system can send gaming information to the mobile playmaker application. Gaming information can include a game instance identifier and a network address of a proxy for communicating with a corresponding game instance.

Figure 2:
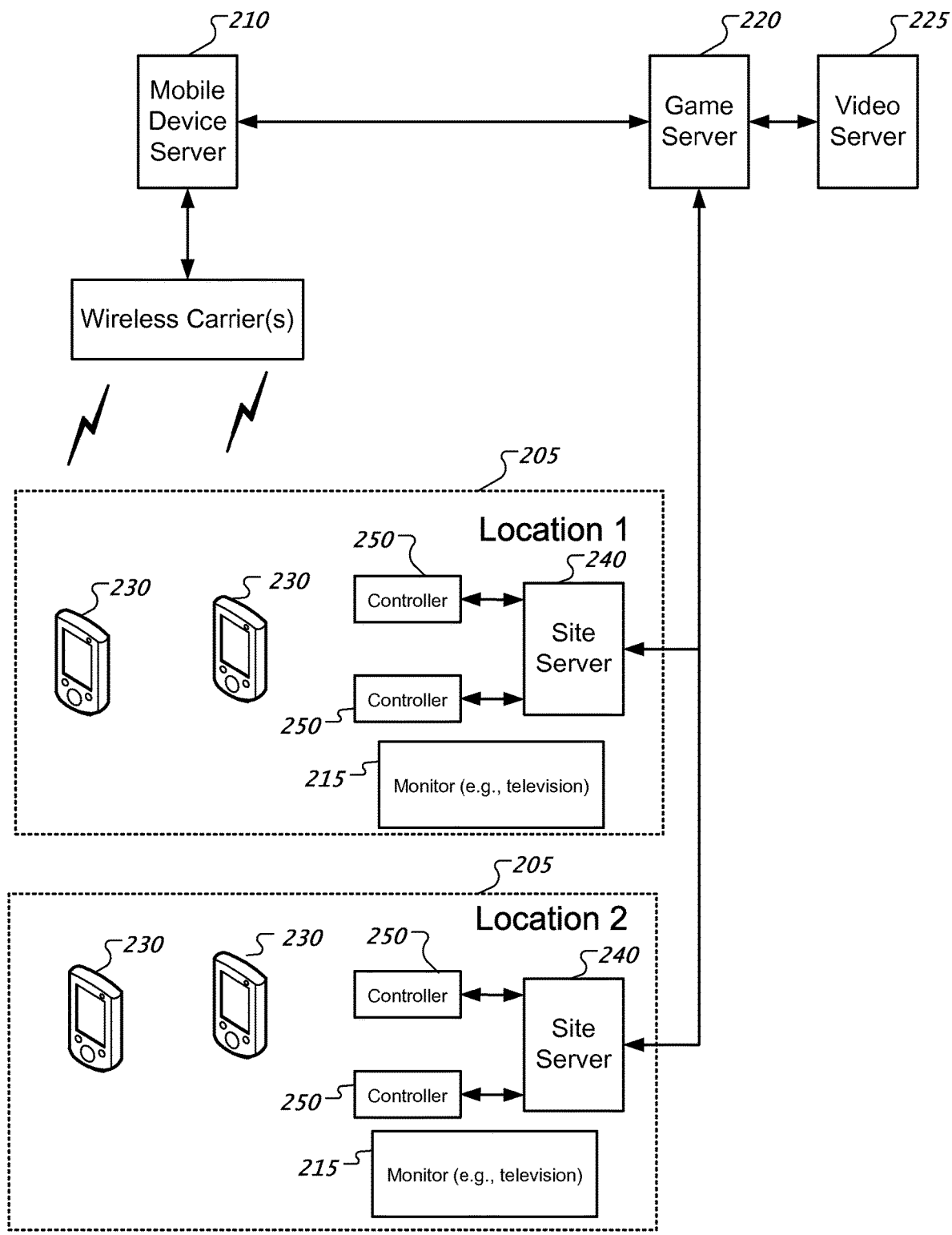

FIG. 2 shows another example of an interactive gaming environment. Gaming establishments 205 can include one or more monitors 215 such as a television to display video feeds. Gaming establishments 205 can host games that are associated with the video feeds. A game server 220 can direct a video feed from a video server 225 to a mobile device 230. A mobile device server 210 can direct communications between mobile devices 230 and site server 240. In some implementations, a game server 220 can send information to cause the mobile device 230 to synchronize game play to the video feed that is being displayed at a specific location. In some implementations, a site server 240 can determine a video feed delay and send a delay value to a mobile device 230 via a game server 220. A local controller 250, connected to a site server 240, can provide an alternate way of interacting with the site server 240.

A video feed can include one or more advertisements. A game control application can switch from an interactive game mode to a video display mode. In a video display mode, the game control application can receive a video feed from the video server and synchronize a display of the video feed on the mobile device to a display of the video feed at a monitor located in a gaming establishment where the device is currently located. Once a play of the advertisement is finished, the mobile device can switch to an interactive game mode.

Figure 3:
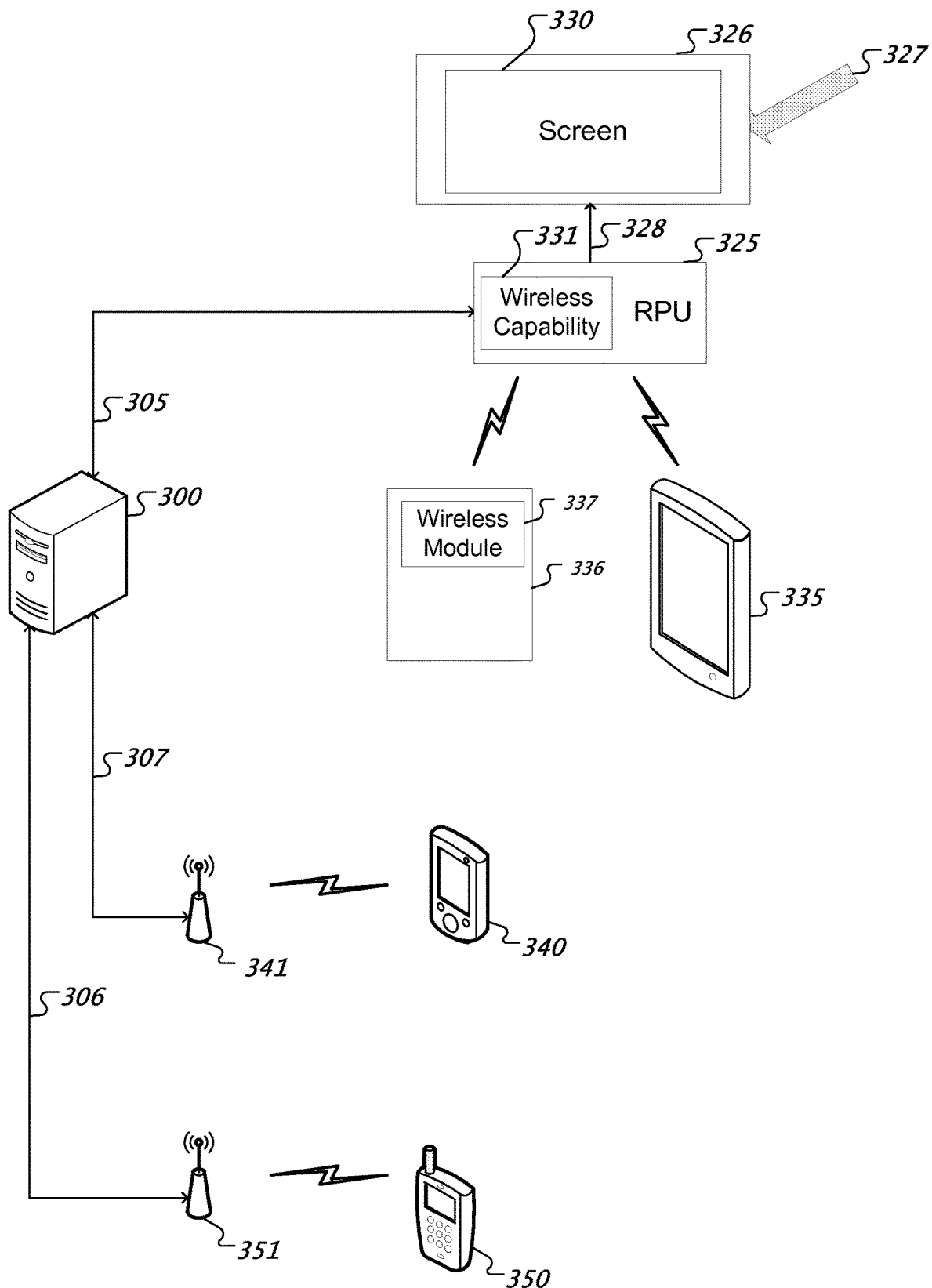

FIG. 3 shows yet another example of an interactive gaming environment. A gaming system can include a server such as a main controller 300. A main controller 300 can communicate over a network line 305 to a remote processing unit (RPU) 325 that is at a gaming location. In some implementations, the RPU can be a computer, a set-top box, or any device with processor electronics. The network line 305 can be a communication path through the Internet, a path through a local area network (LAN), or a general data communication path. The RPU 325 can display content on an output device such as a screen 330 of a television 326 or a monitor via a media link 328. The television 326 can also receive a video feed, e.g., programming 327 such as football games or other television programming. The television 326 can receive programming 327 over many mediums including cable and satellite. The RPU 325 can include a wireless capability 331. The wireless capability 331 can communicate with multiple different mobile devices 335, 336.

In some implementations, a wireless capability 331 can communicate directly with a user's personal mobile device 335. For example, the mobile device 335 can be a cell phone, Blackberry, or PDA. The mobile device 335 can include a WiFi module. The WiFi module can transmit and receive signals in accordance with a protocol such as the IEEE 802.11 family of protocols. The mobile device 335 can search for wireless signals and connect to other mobile devices. The WiFi module of the mobile device 335 can communicate with the RPU 325 over a wireless link, when the mobile device 335 is in range of the wireless capability 331 of the RPU 325.

In some implementations, a mobile phone 340 can be used in a cellular network to communicate directly with the main controller 300. The mobile phone 340 can use resources of a cellular network, such as a wireless communication tower 341 via a wireless link, to communicate with the main controller 300. The cellular network can use a communication path 307 to establish a connection between the tower 341 and the main controller 300. The communication path can include private networks of the cellular network provider and the Internet.

The mobile device 340 can use software such as a native web browser or a custom downloadable program to enable communications with main controller 300. The software can render game stimuli and capture game responses. The program can be written in C, C++, Java, BREW (R), or any other programming language. For example, the program can be written in the device's operating system and can allow direct communication to the main controller 300. The communication can be over regular cellular airwaves or over Short Message Service (SMS).

Another device, such as a mobile phone 350, can use a different wireless network to communication with the main controller 300. The mobile phone 350 can use resources of a wireless network, such as a wireless communication tower 351 via a wireless link, to communicate with the main controller 300. The wireless network can use a communication path 306 to establish a connection between the tower 351 and the main controller 300.

A mobile device 336 can include a Bluetooth™ wireless module 337. In some implementations, the wireless capability 331 of the RPU 325 can include Bluetooth™ capabilities. Therefore, the mobile device 336 can communicate with the wireless capability 331 of the RPU 325 via the Bluetooth™ wireless module 337.\

The mobile device 336 can use software such as a native web browser or a custom downloadable program to enable communications with the RPU 325. The software can capture game responses such as a user pressing a button on the mobile device 336. The software can send the response to the RPU 325. In turn, the RPU 325 can process the game response and/or forward the response to the main controller 300.

The latencies between mobile devices 335, 336, 340, 350 and the main controller 300 can vary. Further, latency can vary widely between different cellular networks and wireless networks. In order to compensate for the varying latencies, a mobile device 335, 336, 340, 350 can send, in addition to the game response, a timestamp indicative of the time when the game response was made. For example, a device can capture the time when a user presses a button that generates the game response. The main controller 300 can receive a response from a mobile device at some later time, perhaps as long as 2 to 15 seconds later. The main controller 360 can look at the timestamp in the response, rather than looking at the response's actual received time. In this way, the latency in the network can be compensated in non-real time.

In some implementations, a mobile device can be a laptop computer. Some implementations can distribute the functional components of the main controller amongst other gaming components such as a RPU. Other implementations can include multiple RPUs. Alternatively, an implementation can include a main controller and mobile devices without the use of a RPU.

Figure 4:
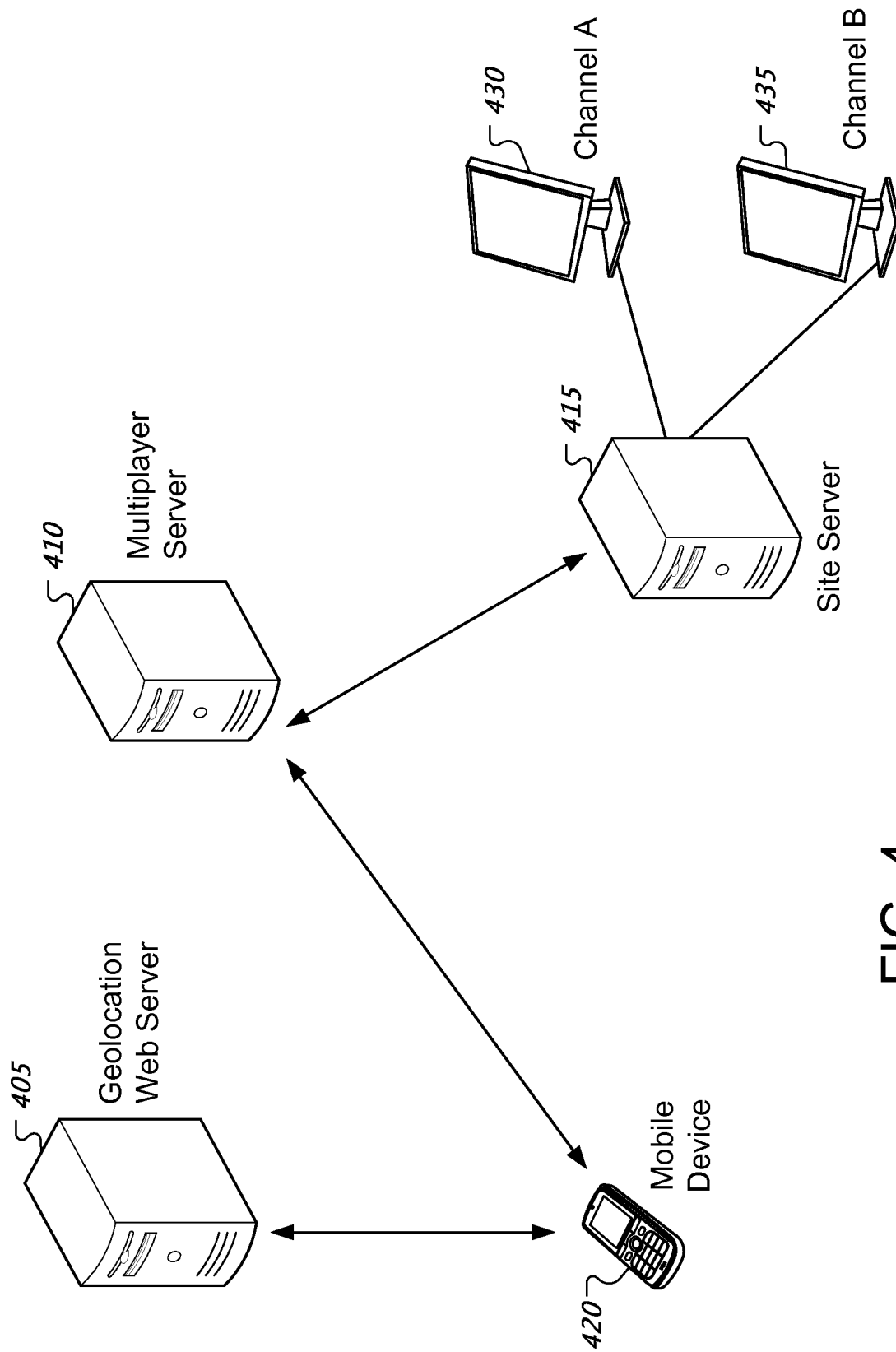

FIG. 4 shows another example of an interactive gaming environment. An interactive gaming environment can include servers such as a geolocation web server 405, a multiplayer server 410, and site servers 415 (only one is shown). The site servers 415 are configured to provide gaming instances at respective gaming locations. In some implementations, a site server 415 can provide multiple gaming instances at a gaming location. A site server 415 can have persistent connections with the multiplayer server 410. The multiplayer server 410 can provide gaming functions such as providing communications among gaming instances, providing highest score information, and gamer chatting services.

A mobile device 420, which can be referred to as a mobile playmaker, can communicate with the geolocation web server 405 to retrieve information about one or more gaming instances. In some implementations, the mobile device 420 transmits geographical coordinates to the geolocation web server 405, and the geolocation web server 405 identifies one or more gaming locations based on a proximity with the mobile device 420.

The mobile device 420 can communicate with a selected gaming instance via the multiplayer server 410. The multiplayer server 410 can provide a duplex connection between the mobile device 420 and a site server 415. Providing a duplex connection can include routing gaming messages between the mobile device 420 and at least one of the site servers 415. The site server 415 can provide gaming video output to respective monitors 430, 435.

Figure 5:
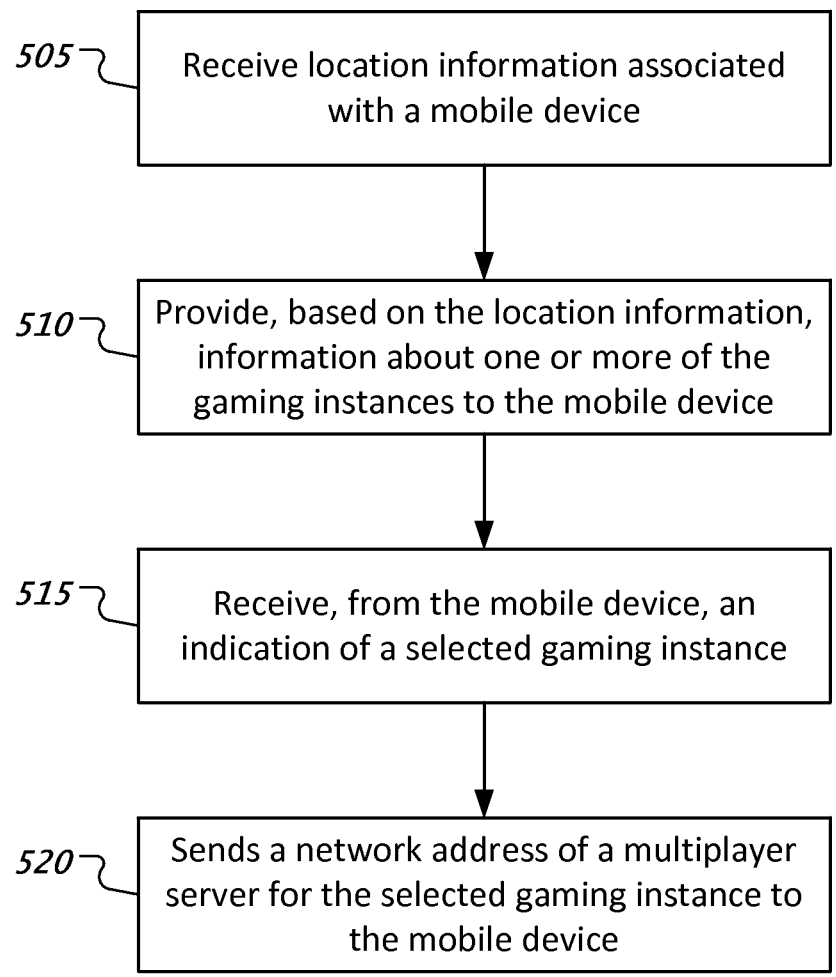
FIG. 5 shows an example of a geolocation web process.

FIG. 5 shows an example of a geolocation web process. At 505, a geolocation web process receives location information associated with a mobile device. At 510, the process provides, based on the location information, information about one or more of the gaming instances to the mobile device. Provided information can include a game title, player status, information about the gaming location, or a combination thereof. At 515, the process receives, from the mobile device, an indication of a selected gaming instance. At 520, the process sends a network address of a multiplayer server for the selected gaming instance to the mobile device. The mobile device can send gaming messages to that network address for a corresponding gaming instance.

Figure 6:
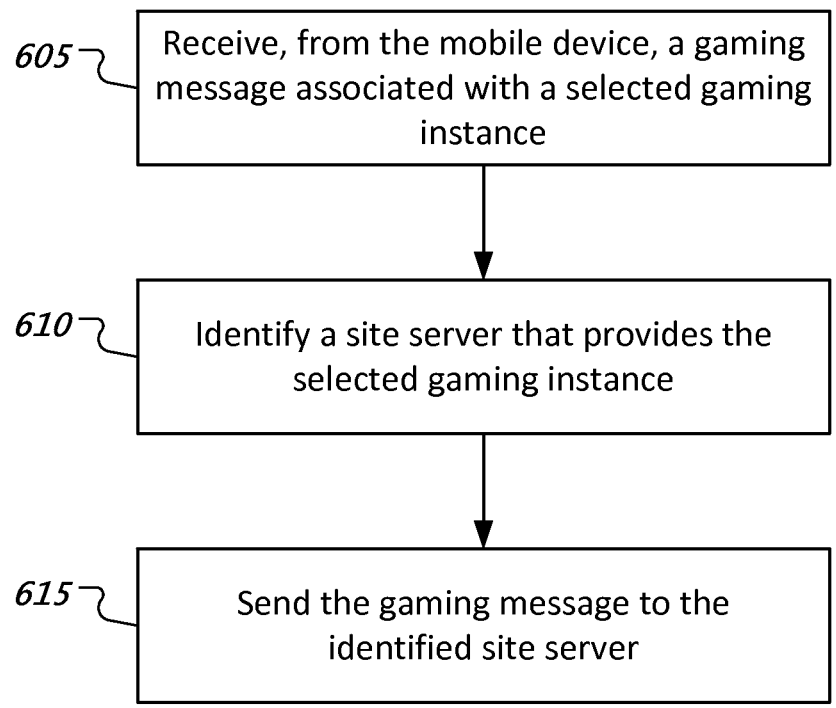
FIG. 6 shows an example of a multiplayer communication process.

FIG. 6 shows an example of a multiplayer communication process. At 605, a multiplayer communication process receives, from the mobile device, a gaming message associated with a selected gaming instance. A gaming message can include a request to join message, game status information, score data, or a game response message (e.g., an answer to a trivia question or a game move indication). At 610, the process identifies a site server that provides the selected gaming instance. In some implementations, identifying a site server can include using a selected gaming instance received by a web server. In some implementations, a gaming message includes a gaming instance identifier that is associated with a site server. At 615, the process sends the gaming message to the identified site server.

A system for game play, in some implementations, can include two or more site servers; a gaming server system that is configured to contain, receive, integrate and execute video data, game data and game application; and a mobile device running a game control application which encodes and sends the mobile device's physical location to the gaming server system. In some implementations, a gaming server system is capable of matching a mobile device's physical location to at least one of the two or more site servers. In some implementations, the gaming server system is configured to run one or more game applications that build and run game contests among players connected via respective mobile devices in a given physical location and players connected via a site server at the same physical location. In some implementations, the gaming server system includes a video server to provide a video feed.

In some implementations, a system for game play can include a television distribution system. For example, an interactive gaming service involving one or more subscribers (or players/users) can be provided over a television distribution system. Game play can be initiated from a client device, such as a mobile device or a set-top box included in the television distribution system. Further, execution and coordination of a game instance can be controlled by a server system included in the television distribution system. For example, the server system can be configured to control access to a game, to manage game play, to record game scores, and to facilitate communication and interaction between subscribers participating in one or more game instances. Other interactive services also can be provided such as shopping, weather forecasts, and chatting.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One of more of the described systems and techniques can be combined with technology disclosed by U.S. patent application Ser. No. 12/060,127, filed Mar. 31, 2008, and entitled "VIDEO FEED SYNCHRONIZATION IN AN INTERACTIVE ENVIRONMENT." This application is incorporated herein by reference.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks). The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A central gaming server for allowing local game players using local gaming controllers and a player using a cellular communication device to participate in games against or with each other, comprising:
   a processor for simultaneously providing information about the availability of a plurality of games to the cellular communication device;
   the processor further for receiving a request from the cellular communication device to participate in a first game selected from the information about the availability of the plurality of games;
   the processor further for receiving a request from the cellular communication device for a list of venues in proximity to the cellular communication device that are or will be playing the first game by the local game players;
   the processor further for determining a location of the cellular communication device;
   the processor further for determining an identification of venues that are or will be playing the game by the local game players in proximity to the location of the cellular communication device;
   the processor further for providing the identification of venues to the cellular communication device;
   the processor further for building the first game to include the player using the cellular communication device and a first local gaming controller; and
   the processor further for relaying game play information between the cellular communication device and the first local gaming controller as the first game is played by the player using the cellular communication device and a local game player.

2. The central gaming server of claim 1, further comprising:
   the processor further for causing at least a portion of the game play information to be displayed by a monitor located within one of the venues for display to the local game player.

3. The central gaming server of claim 2, further comprising:
   the processor further for receiving a video feed related to the first game from a video server; and
   the processor further for providing the video feed to the cellular communication device and to the first local gaming controller;
   wherein the local gaming players view the video feed on the monitor as the first game is played and the player that uses the cellular communication device views the video feed on the cellular communication device as the first game is played.

4. The central gaming server of claim 3, wherein the video feed comprises video of a live sporting event.

5. The central gaming server of claim 1, further comprising:
   the processor further for receiving a request from the cellular communication device for information about any games that are or will be played by local game players at venues in proximity to a location of the cellular communication device;
   the processor further for determining an identification of games that are or will be played by local game players at venues in proximity to a location of the cellular communication device; and
   the processor further for providing the identification of games to the cellular communication device.

6. The central gaming server of claim 1, further comprising:
   the processor further for determining a network address for the cellular phone to connect to in order for the player using the cellular communication device to play the game.

7. The central gaming server of claim 1, further comprising:
   the processor further for providing synchronization information to the cellular communication device participating in the first game, the synchronization information used by the cellular communication device to synchronize game play between the cellular communication device and the first local communication device.

8. The central gaming server of claim 1, further comprising:
   the processor further for building the first game to include the player using the cellular communication device, the first local gaming controller and a second local gaming controller located at a second venue.

9. A method, performed by a central gaming server, for allowing local game players using local gaming controllers and a player using a cellular communication device to participate in games against or with each other, the method comprising:
   simultaneously providing information about the availability of a plurality of games to the cellular communication device;
   receiving a request from the cellular communication device to participate in a first game selected from the information about the availability of the plurality of games;
   receiving a request from the cellular communication device for a list of venues in proximity to the cellular communication device that are or will be playing the first game by the local game players;
   determining a location of the cellular communication device;
   determining an identification of venues that are or will be playing the game by the local game players in proximity to the location of the cellular communication device;
   providing the identification of venues to the cellular communication device;
   building the first game to include the player using the cellular communication device and a first local gaming controller; and
   relaying game play information between the cellular communication device and the first local gaming controller as the first game is played by the player using the cellular communication device and a local game player.

10. The method of claim 9, further comprising:
    causing at least a portion of the game play information to be displayed to the local game player via a monitor located within the public venue.

11. The method of claim 10, further comprising:
    receiving a video feed related to the first game from a video server; and
    providing the video feed to the cellular communication device and to the first local gaming controller;

wherein the local gaming players view the video feed on the monitor as the first game is played and the player that uses the cellular communication device views the video feed on the cellular communication device as the first game is played.

12. The method of claim 11, wherein the video feed comprises video of a live sporting event.

13. The method of claim 9, further comprising:
receiving a request from the cellular communication device for information about any games that are or will be played by local game players at venues in proximity to a location of the cellular communication device;
determining an identification of games that are or will be played by local game players at venues in proximity to a location of the cellular communication device; and
providing the identification of games to the cellular communication device.

14. The method of claim 9, further comprising:
determining a network address for the cellular phone to connect to in order for the player using the cellular communication device to play the game.

15. The method of claim 9, further comprising:
providing synchronization information to the cellular communication device participating in the first game, the synchronization information used by the cellular communication device to synchronize game play between the cellular communication device and the first local communication device.

16. The method of claim 9, further comprising:
building the first game to include the player using the cellular communication device, the first local gaming controller and a second local gaming controller located at a second public venue.

\* \* \* \* \*